H. KIEHLBAUCH.
HEADLIGHT OPERATING MECHANISM.
APPLICATION FILED APR. 29, 1911.
1,008,649.
Patented Nov. 14, 1911.
2 SHEETS—SHEET 1.
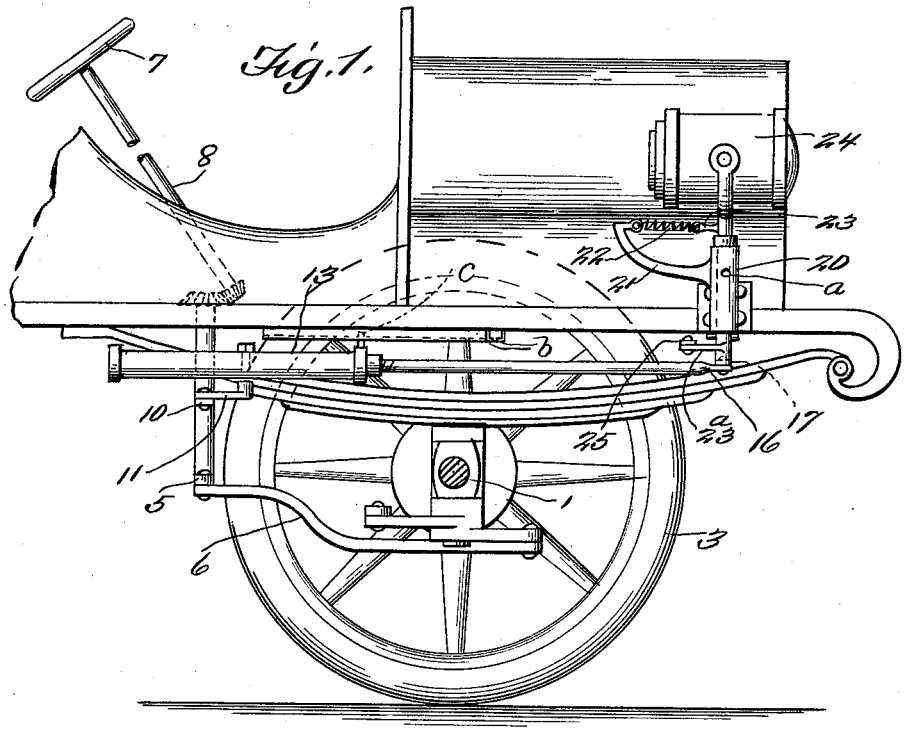
Witnesses
Inventor
Henry Kiehlbauch
By D. Swift &C.
Attorney H. KIEHLBAUCH.
HEADLIGHT OPERATING MECHANISM.
APPLICATION FILED APR. 29, 1911.
1,008,649.
Patented Nov. 14, 1911.
2 SHEETS—SHEET 2.
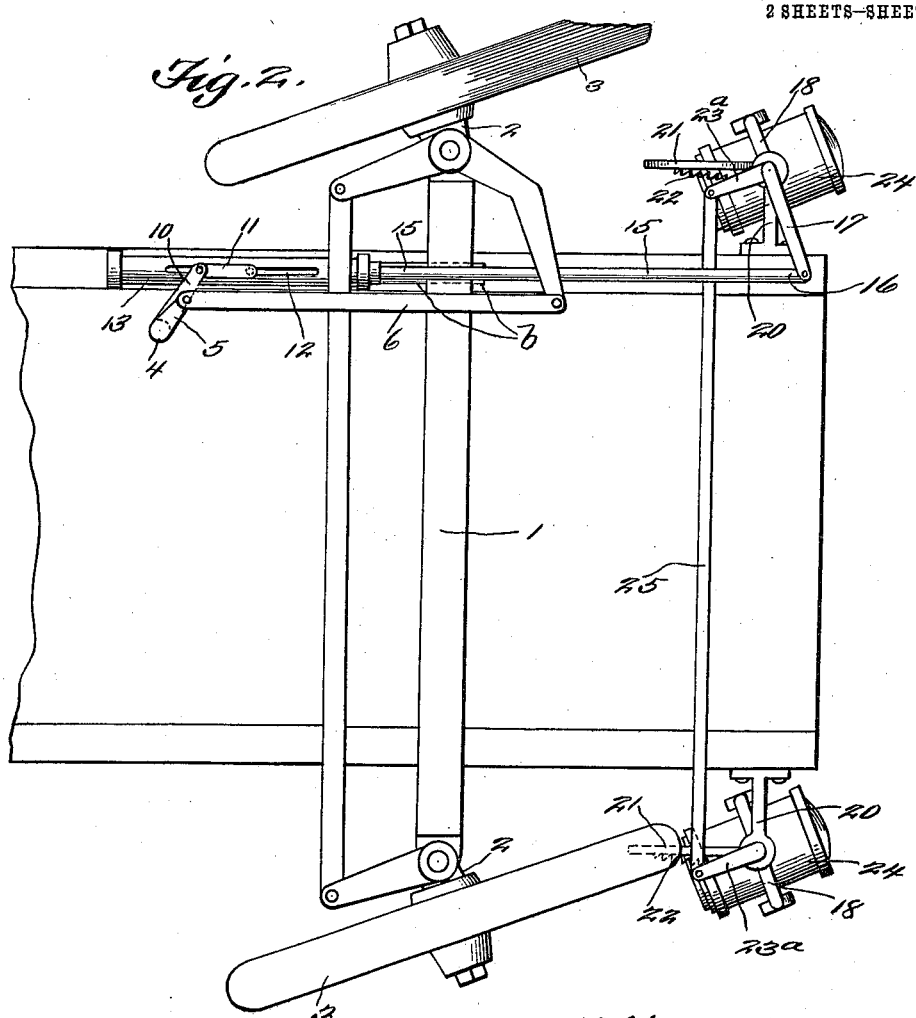
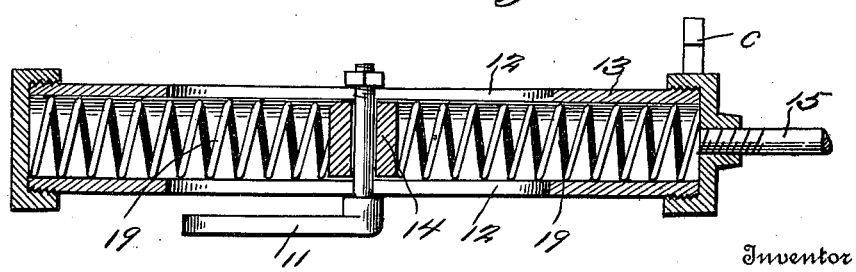
Witnesses
Inventor
Henry Kiehlbauch
By D. Swift &c.
Attorney

UNITED STATES PATENT OFFICE.

HENRY KIEHLBAUCH, OF TRIPP, SOUTH DAKOTA.

HEADLIGHT-OPERATING MECHANISM.

1,008,649.      Specification of Letters Patent.      Patented Nov. 14, 1911.

Application filed April 29, 1911. Serial No. 624,160.

*To all whom it may concern:*

Be it known that I, HENRY KIEHLBAUCH, a citizen of the United States, residing at Tripp, in the county of Hutchinson and State of South Dakota, have invented a new and useful Headlight-Operating Mechanism; and I do hereby declare the following to be a full, clear, and exact description of the invention, such as will enable others skilled in the art to which it appertains to make and use the same.

This invention pertains to a new and useful headlight operating mechanism.

The invention aims as its primary object, to provide a yieldable connection between the headlight operating mechanism and the steering wheel so that the vibrations of the steering gear incident to the movements of the vehicle will not be communicated to the headlights.

A further object of the invention is the provision of a yielding connection between the lamp supporting yokes and an arm of the yoke supporting brackets, for holding the lamps yieldably in a straight position.

In the drawings, there is only disclosed one form of the present invention, but in practical fields this form may require alterations, to which the applicant is entitled, provided the alterations are comprehended by the appended claims.

The invention comprises further features and combination of parts, as hereinafter set forth, shown in the drawings and claimed.

In the drawings:—Figure 1 is a view in side elevation of a portion of an automobile, showing the headlight operating mechanism as applied thereto, the same being constructed in accordance with the invention. Fig. 2 is a bottom plan view, showing the front wheels of the automobile and the headlights in adjusted positions. Fig. 3 is an enlarged detail view of the yoke supporting bracket. Fig. 4 is a detail sectional view through the yielding connections between the headlight operating mechanism and the steering wheel connection.

Referring to the drawings, 1 designates the usual form of front axle, to which the stub shafts 2 of the front wheels 3 are connected. The usual form of steering wheel connections 4, 5, and 6 are connected to the stud axles, so as to steer the front wheels. These connections, 4, 5 and 6, also include a steering wheel 7. The steering wheel shaft 8 has bevel gear connections with the shaft 4, which connects to the member 6, whereby the front wheels may be turned in either direction. Projecting laterally of the shaft 4 is an arm 10 which is provided at its free end with an angled end portion 11. This angled end extends through a slot 12 of a sleeve 13, and is swivelly connected to a piston core 14, which is slidably mounted in the sleeve. This sleeve 13 is threaded to the rod 15 the end 16 of which is pivotally connected to the right angled extending arm 17 of the lamp supporting yoke 18. On each side of the piston core, and between it and one end of the sleeve (which is closed) and the end of the rod 15 springs 19 are arranged. By virtue of the springs, it will be observed that the piston core is slidably and yieldably mounted in the sleeve, and furthermore, it will be observed by such connection that any vibrations incident to the movement of the vehicle or the front wheels thereof, will not be transferred to the headlights.

The lamp supporting yokes 18 are revolubly mounted in the sleeve brackets 20, which are fastened to the front portion of the automobile. Extending from the brackets are the arms 21, to which the springs 22 are connected, while the other ends of which are connected to the arms 23 of the yokes, thus providing means for holding the lamps yieldably in straight positions. To cause the lamps 24 to move in unison, and with the front wheels of the automobile, the arms 23ª are connected by a rod 25.

When the steering wheel is manipulated, the rod 15 is reciprocated, which in turn will revolve the headlights because of its connection with the arm 17, and by virtue of the springs 22, the headlight operating mechanism is assisted when returning the lamps in their straight positions, that is, in positions which will throw the rays of light directly in front of the automobile.

From the foregoing, the essential features, elements and the operation of the device together with the simplicity thereof, will be clearly apparent.

The invention having been set forth, what is claimed as new and useful, is:—

1. In a motor vehicle, the combination with the steering mechanism, of a rod operated by said mechanism and provided with an angled end, a core piston swiveled to the angled end, a sleeve having slots through which the angled end transversely extends, so as to move longitudinally within the slots, the piston being slidably mounted in the sleeve, yielding means on each side of the piston and acting against the closed ends of the sleeve, headlights, and a connection between one of the headlights and the sleeve.

2. In combination, a steering mechanism, headlights, supporting yokes for the headlights and provided with extensions, brackets having sleeves revolubly receiving the extensions of the yokes, the sleeves having arms projecting therefrom, yielding connections between the arms and the extensions of the yokes, connections between the lower ends of the extensions of the yokes so that the yokes may move in unison, and yieldable connections between one of the extensions of one of the yokes and the steering mechanism.

3. In combination, a steering mechanism of a motor vehicle, headlights, yokes for supporting head lights and provided with extensions, brackets secured to the vehicle and terminating at their outer ends with sleeves to revolubly receive the extensions, the extensions having arms terminating into eyes extending therefrom immediately below the yokes, the sleeves having arms extending substantially in the same direction as the arms of the extensions and substantially parallel thereto, the arms of the sleeves having upwardly turned portions, which terminate into angular ends having eyes disposed substantially opposite the arms of the extensions, springs connecting the eyes, and yieldable connections between one of the extensions and the steering mechanism.

In testimony whereof I have signed my name to this specification in the presence of two subscribing witnesses.

HENRY KIEHLBAUCH.

Witnesses:
　L. T. KINTZ,
　D. A. MARKLY.

Copies of this patent may be obtained for five cents each, by addressing the "Commissioner of Patents, Washington, D. C."